(12) United States Patent
Fruehwald et al.

(10) Patent No.: US 7,223,196 B2
(45) Date of Patent: May 29, 2007

(54) GEAR MOTOR WITH FAIL-SAFE DEVICE

(75) Inventors: Bernd Fruehwald, Erlbach (DE);
Martin Koechling, Nuremberg (DE);
Ruediger Spitzner, Berg (DE);
Juergen Strueber, Nuremberg (DE)

(73) Assignee: Buehler Motor GmbH, Nuremberg (DE)

( * ) Notice: Subject to any disclaimer, the term of this patent is extended or adjusted under 35 U.S.C. 154(b) by 201 days.

(21) Appl. No.: 11/123,236

(22) Filed: May 6, 2005

(65) Prior Publication Data

US 2005/0250610 A1 Nov. 10, 2005

(30) Foreign Application Priority Data

May 6, 2004 (DE) .................. 10 2004 022 407

(51) Int. Cl.
*F16H 3/44* (2006.01)
(52) U.S. Cl. .................................... 475/299
(58) Field of Classification Search ........... 188/156, 188/157, 158, 159, 160, 161; 475/299, 154, 475/149
See application file for complete search history.

(56) References Cited

U.S. PATENT DOCUMENTS 5,810,141 A * 9/1998 Organek et al. .......... 192/35

6,428,442 B1 * 8/2002 Turgay et al. ............ 475/321
2004/0097318 A1 5/2004 Greuel et al.

FOREIGN PATENT DOCUMENTS

DE 10117934 A1 10/2002

* cited by examiner

*Primary Examiner*—Dirk Wright
(74) *Attorney, Agent, or Firm*—Jacobson Holman PLLC

(57) ABSTRACT

The invention concerns a gear motor (1) with a fail-safe device (2) consisting of a housing (4), an electromotor (3), a reduction gear (5) with at least one planetary gear (6), an electromagnetic clutch (11) and an output gear shaft (13), wherein the planetary gear (6) has an internal gear. The internal gear is in mesh with at least one planetary wheel (8) and is fixed in its operation relative to the housing (4). The planetary gear comprises the electromagnetic clutch (11), a magnetically conductive armature and a magnetically conductive stator (21) in which an electromagnetic coil (15) is arranged. During the application of current to the electromagnetic coil (15) the internal gear (10) is secured against turning. The task of the invention is to provide for a reliable operation of the fail-safe device in a gear motor of such kind using less construction space and less number of components thus enabling simple assembly. This task is solved in accordance with the present invention by providing an internal gear (10) that acts as a magnet armature, is axially displaceable and whose geometric alignment is not determined by the housing (4) at least during a power-on and off condition of the electromagnetic clutch (11).

19 Claims, 2 Drawing Sheets

GEAR MOTOR WITH FAIL-SAFE DEVICE

BACKGROUND AND SUMMARY OF THE INVENTION

The present invention includes a gear motor with a fail-safe device consisting of a housing, an electromotor, a reduction gear with at least one planetary gear, an electromagnetic clutch and an output gear shaft, wherein the planetary gear has an internal gear. The internal gear is in mesh with at least one planetary wheel and is fixed in its operation relative to the housing. The planetary gear comprises the electromagnetic clutch, a magnetically conductive armature and a magnetically conductive stator in which an electromagnetic coil is arranged. During the application of current to the electromagnetic coil the internal gear is secured against turning. The term 'electromagnetic brake' is also applicable for the term 'electromagnetic clutch' which is used frequently in the following description.

From DE 101 17 934 A1 a generic gear motor is known that consists of an electromotor and a reduction gear wherein an internal gear can be coupled and decoupled in its operation by a brake assembly that can be activated electromagnetically in order to manually activate an actuator that is connected to an output gear shaft, in this case a hatchback of a vehicle. In a known gear motor, the electromagnet is arranged radially outside a housing that encloses the reduction gear and can be coupled with the internal gear via an arrangement of levers due to which a considerable construction space and a large number of components are necessary. In addition, the assembly of these components is difficult to some extent. The internal gear of DE 101 17 934 A1 has a large axial length and is supported through an expensive implementation over ball bearings in order to ensure a reliable operation.

Therefore an object of the invention is to provide for reliable operation of the fail-safe device in a gear motor of the aforementioned kind using less construction space and fewer components thus enabling simple assembly.

Another object of the invention is to provide for an internal gear that acts as a magnet armature, is axially displaceable and whose radial outer surface is not a guide surface. Thereby the internal gear may be constructed short without the risk of jamming.

The objects of the present invention are met by providing an internal gear that acts as a magnet armature, is axially displaceable and whose geometric alignment is not determined by the housing at least during a power-on or off condition of the electromagnetic clutch. Since the internal gear itself acts as a magnet armature no additional component is required for this purpose that could be defective and would have to be mounted additionally. The ability for axial displacement of the internal gear allows for a decoupling of the internal gear and the output gear shaft. Since the geometric alignment of the internal gear is not determined by the housing, reliable clutching and declutching is ensured and jamming is safely avoided. The small number of components also economizes on the construction space.

Further forms of the invention are presented in the remainder of the application including the claims. The construction space can be reduced to the extent that the ratio of the axial length of the internal gear to its diameter is smaller than 0.5.

BRIEF DESCRIPTION OF THE DRAWINGS

An example of the design form of the invention is explained more elaborately below on the basis of the drawing. The drawing illustrates.

DETAILED DESCRIPTION OF THE DRAWINGS

Figure 1:
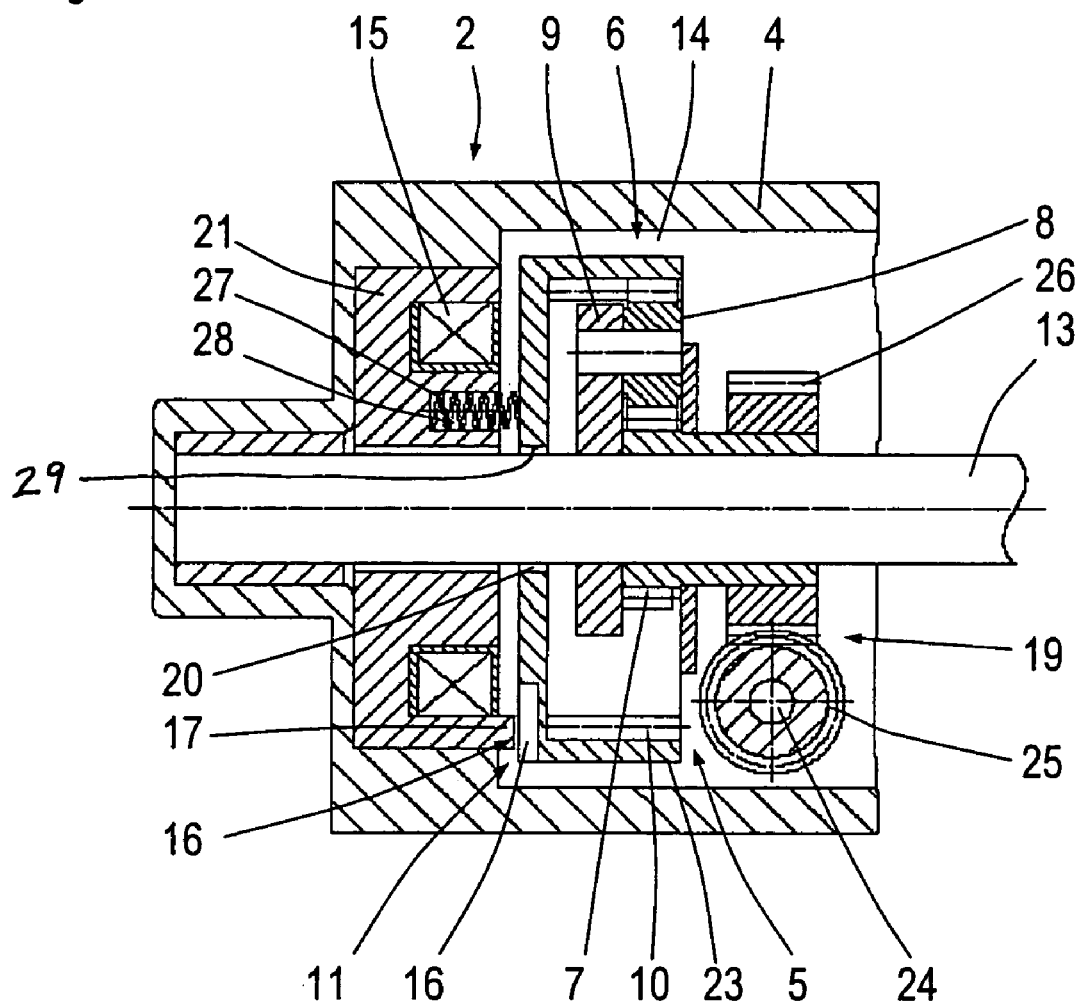
FIG. 1 is a section view through a gear motor.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 illustrates a section view through a gear motor 1 with a fail-safe device 2 in accordance with the present invention, with an electromotor 3, a reduction gear 5 consisting of a worm gear 19 and a planetary gear 6, a housing 4, an electromagnetic clutch 11, and an output gear shaft 13 wherein the worm gear 19 consists of a worm 25 that is firmly connected to a motor shaft 24 of the electromotor 3 and a worm wheel 26 driven by the worm. The planetary gear 6 comprises a sun wheel 7 that has a torque-proof connection with the worm wheel 26, a carrier 9 that has a torque-proof connection with the output gear shaft 13, and that supports three planetary wheels 8 and an internal gear 10. The electromagnetic clutch 11 consists of a housing-tight magnetic stator 21, an electromagnetic coil 15 accommodated in the stator and a magnet armature formed by the internal gear 10. In the present example three cams 17 are arranged axially on the magnetic stator 21 and three grooves 18 are arranged axially on the internal gear 10 that interlock when current is applied to the electromagnetic coil 15 and after a synchronization phase as a form-fit clutch 16. A clearance 14 is provided between a radial outer surface 23 of the internal gear 10 and the housing 4 in order to avoid jamming of the internal gear that also acts as a magnet armature. For the same reason also between the output gear shaft 13 and the inner surface of a central recess 20 is provided in the hollow shaft 10, a ring-shaped clearance 29 is provided. In order to facilitate the disengaging of the electromagnetic clutch 11 with remanence magnetism, e.g., three pressure springs 27 are provided that are accommodated in recesses 28 of the magnetic stator 21 and that store energy when current is applied to the electromagnetic coil 15.

Figure 2A:
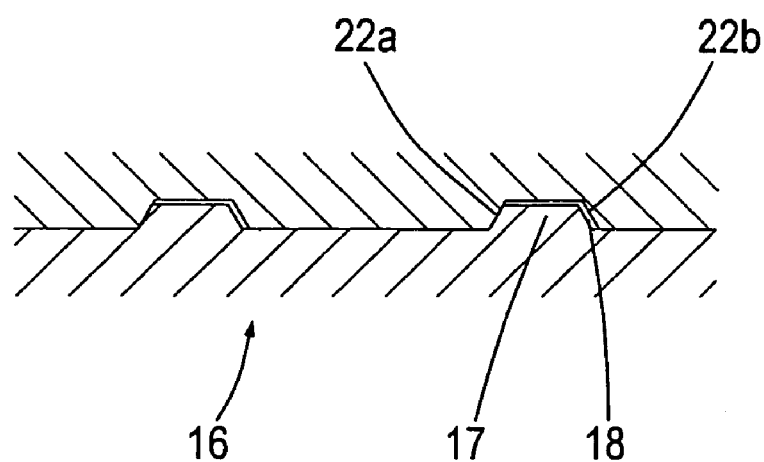
FIG. 2a is a section view of a first design form of a form-fit clutch.
Figure 2B:
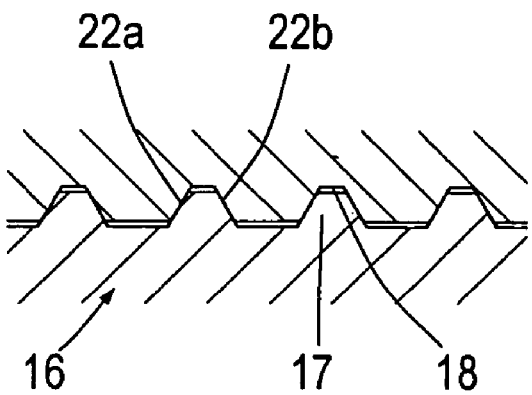
FIG. 2b is a section view of a second design form of the form-fit clutch.
Figure 2C:
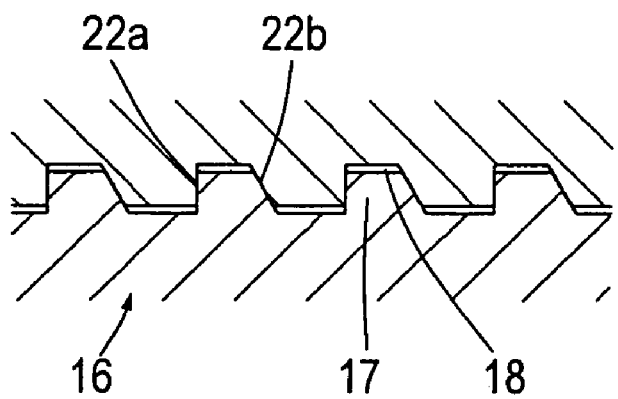
FIG. 2c is a section view of a third design form of the form-fit clutch.

FIGS. 2a to 2c illustrate the section view of three design forms of the form-fit clutch 16—that are each presented as a separate component for purposes of simplification. In FIGS. 2a and 2b two interlocking cams 17 and grooves 18 are illustrated whose flanks 22 are inclined symmetrically. In FIG. 2a, the cams 17 and grooves 18 are dimensioned such that another small rotational clearance is available, while the form-fit clutch 16 in FIG. 2b is designed free of clearance. Both of the flanks 22a, 22b of the design form in accordance with FIG. 2c are designed asymmetrically so that a ratcheting is possible only in a rotational direction; here too the form-fit clutch 16 is free of clearance.

Figure 3:
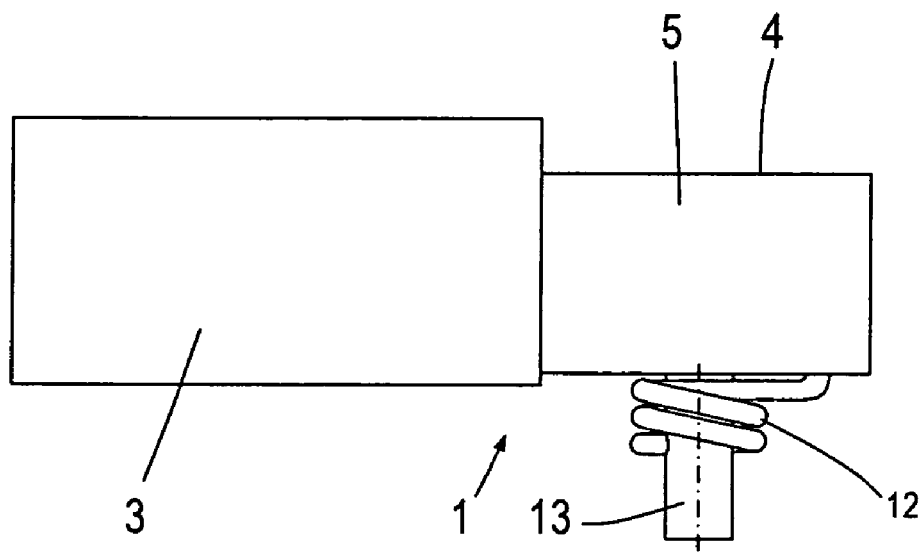
FIG. 3 is a simplified general view of the gear motor.

FIG. 3 illustrates a simplified general view of the gear motor 1, with the electromotor 3, the housing 4 of the output gear shaft 13 and a return spring 12, which is engaged on one side at the output gear shaft 13 and on the other side on the housing 4 and the output gear shaft 13. The return spring resets an actuator (not illustrated) in the case of an open electromagnetic clutch.

Advantageously, in the zero-current state of the electromagnetic coil 15, the internal gear 10 is decoupled from the housing 4 and thus the electromotor 3 is decoupled from the output gear shaft 13. Due to this, an adjustment of the actuator is possible by a return spring 12 that is engaged at the output gear shaft 13 and/or at the actuator. This arrangement enables a defined rest position of the actuator or a manual operation in case of failure of the electromotor.

In order to create a compact drive module that can be easily coupled to the actuator, it is advantageous if the return spring 12 is engaged on one side at the housing 4 and on the other side at the output gear shaft 13.

The reliability of the coupling and decoupling process can be ensured if a clearance 14 is arranged in the radial direction between the internal gear 10 and the housing 4.

Furthermore, during the operation of the electromotor and/or when current is applied to the electromagnetic coil 15, the alignment of the internal gear 10 is determined exclusively by the planetary wheels 8 and the electromagnetic clutch 11.

It is the intention of the present invention to combine the function of the electromagnetic coil 15 and that of the electromotor 3 with each other such that current is applied to the electromagnetic coil 15 during the operation of the electromotor 3. This automatically results in ensuring a constant torque transmission to the actuator during the operation of the electromotor. Also in case of an inactive electromotor or in the case of a motor failure it is not necessary to turn back the electromotor. Where a self-locking gear is used, a spring-loaded or manually operated reset of the actuator is possible.

A particularly simple construction results if the internal gear 10 is a single piece friction-fit and form-fit clutch.

In order to enable the transfer of greater forces, the magnetic stator 11 and the internal gear 10 together form a form-fit clutch 16.

The form-fit clutch is further improved by providing a multitude of interlocking cams 17 and grooves 18 for the formation of a form fit and that are shaped such that disengagement is possible in a rotational direction and impossible in the opposite direction of rotation. The multitude of cams and grooves enables fast synchronization during coupling. Should the electromagnetic clutch also be used as an overload clutch, it is significant to adjust the tilt angles of the cams and grooves to each other such that a ratcheting of the motor is possible. In the application of a return spring, the ratchet function is necessary only in the rotational direction so that steeper flank angles can be selected in the opposite direction. The advantage of this is that during coupling a ratcheting with corresponding noise development is avoidable particularly if a flank 22 of the cams 17 and of the grooves 18 is oriented at least at right angles with the rotation plane.

The internal gear should be centered in its operation. This is achieved by the interlocking cams and grooves. This centering is provided both if there remains a small rotational clearance between the cams and the grooves and also if they interlock free of clearance. In the presence of a rotational clearance the centering takes place after the activation of the motor by the interacting flanks.

The invention is particularly suitable in reduction gears that consist of, e.g., a self-locking worm gear 19 and the planetary gear 6 wherein the worm gear 19 is arranged between the electromotor 3 by way of motor shaft 24 and the planetary gear 6.

It is advantageous to provide a single piece or torque-proof connection of the output gear shaft 13 with the planet carrier 9 and to let the output gear shaft 13 pass through a central recess 20 of the internal gear.

Analogous to the radial outer surface of the internal gear 10 the central recess 20 also has no bearing or guiding function that could represent a risk of jamming. For this purpose the ring-shaped clearance 29 is provided between the output gear shaft 13 and an inner surface of the magnetic stator 21 limiting the central recess 20.

The gear motor in accordance with the present invention is preferably used as an actuating drive for a transfer gearbox. In this application in motor vehicles, the distribution of the drive torque between front and rear axles can be dynamically controlled to increase driving comfort. That means that in the case of an activated drive motor of a vehicle, the electromagnetic coil and the electromotor also are operated constantly. As soon as the vehicle is turned off, the transfer gear should be adjusted in a defined rest position. According to the invention this can occur automatically by means of the return spring if the electromagnetic clutch is opened in the zero-current state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

List of Reference Symbols
1. Gear motor
2. Fail-safe device
3. Electromotor
4. Housing
5. Reduction gear
6. Planetary gear
7. Sun wheel
8. Planetary wheel
9. Carrier
10. Internal gear
11. Electromagnetic clutch
12. Return spring
13. Output gear shaft
14. Clearance
15. Electromagnetic coil
16. Form-fit clutch
17. Cam
18. Groove
19. Worm gear
20. Central recess
21. Magnetic stator
22a, 22b Flank
23 Radial outer surface (of the internal gear)
24 Motor shaft
25 Worm
26 Worm wheel
27 Pressure spring
28 Recesses
29 Ring Shaped Clearance

What is claimed is:

1. A gear motor device with a fail-safe device comprising:
a housing;
a reduction gear positioned within the housing, the reduction gear having at least one planetary gear fixed relative to the housing, the at least one planetary gear having an internal gear;
an electromotor operatively secured to the reduction gear;
an output gear shaft;
at least one planetary wheel secured to the output gear shaft and meshing with the internal gear;
an electromagnetic clutch including a magnetically conductive armature and a magnetically conductive stator;
an electromagnetic coil arranged in the magnetically conductive stator so that, during the application of current to the electromagnetic coil, the internal gear is secured against turning, and the internal gear acts as the magnet armature, is axially displaceable and its geometric alignment is not determined by the housing at least during a power-on or off switching operation of the electromagnetic clutch.

2. A gear motor with a fail-safe device comprising:
a housing;
a reduction gear positioned within the housing, the reduction gear having at least one planetary gear fixed relative to the housing, the at least one planetary gear having an internal gear;
an electromotor operatively secured to the reduction gear;
an output gear shaft;
at least one planetary wheel secured to the output gear shaft and meshing with the internal gear;
an electromagnetic clutch including a magnetically conductive armature and a magnetically conductive stator;
an electromagnetic coil arranged in the magnetically conductive stator so that, during the application of current to the electromagnetic coil, the internal gear is secured against turning, and the internal gear acts as the magnet armature, is axially displaceable, and its radial outer surface is not a guide surface.

3. Gear motor device in accordance with claim 1 wherein the ratio of the axial length of the internal gear to its diameter is smaller than 0.5.

4. Gear motor device in accordance with claim 1, further comprising
an actuator; and
a return spring engaged at the output gear shaft and/or at the actuator, and wherein, when no current is passing through the electromagnetic coil, the internal gear is decoupled from the housing and thus the electromotor is decoupled from the output gear shaft due to which an adjustment of the actuator can be brought about by the return spring.

5. Gear motor device in accordance with claim 4, wherein the return spring is engaged on one side at the housing and on the other side at the output gear shaft.

6. Gear motor device in accordance with claim 1, further comprising a clearance arranged in the radial direction between the internal gear and the housing.

7. Gear motor device in accordance with claim 1, wherein the alignment of the internal gear during the operation of the electromotor and/or when current is applied to the electromagnetic coil is determined exclusively by the planetary wheels and the electromagnetic clutch.

8. Gear motor device in accordance with claim 1, means for applying current to the electromagnetic coil during the operation of the electromotor.

9. Gear motor device in accordance with claim 1, wherein the internal gear is a single piece friction-fit and form-fit clutch.

10. Gear motor device in accordance with claim 9 wherein the magnetic stator and the internal gear together form a form-fit clutch.

11. Gear motor device in accordance with claim 10, wherein, for the formation of a form fit, a multitude of interlocking cams and grooves are provided that are shaped such that disengagement is possible in a rotational direction and impossible in the opposite direction of rotation.

12. Gear motor device in accordance with claim 10, wherein at least three cams and three grooves are provided for the formation of a form fit.

13. Gear motor device in accordance with claim 11, wherein, when current is applied to the electromagnetic coil, a small rotational clearance or no rotational clearance exists between the cams and the grooves.

14. Gear motor device in accordance with claim 11, wherein a flank of the cams and the grooves is oriented at least approximately at right angles with the rotation plane.

15. Gear motor device in accordance with claim 1, wherein the reduction gear further comprises a self-locking worm gear which is arranged between the electromotor and the planetary gear.

16. Gear motor device in accordance with claim 1, wherein the output gear shaft has a single piece connection with the planet carrier or a torque-proof connection with the planet carrier, the output gear shaft passing through a central recess of the internal gear.

17. Gear motor device in accordance with claim 16 wherein the central recess has no storing or guiding function.

18. Gear motor device in accordance with claim 17 further comprising a ring-shaped clearance provided between the output gear shaft and the recess.

19. For use in activating a transfer gearbox, an actuating drive with a gear motor device as defined in claim 1.

* * * * *